T. F. GLENN.
ARTIFICIAL TOOTH.
APPLICATION FILED FEB. 5, 1916.
1,209,142.
Patented Dec. 19, 1916.
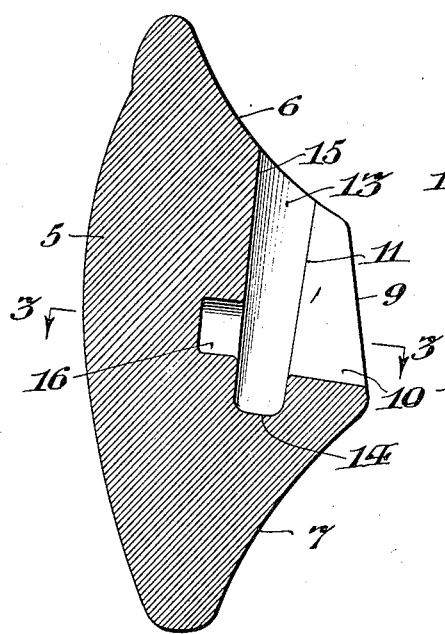
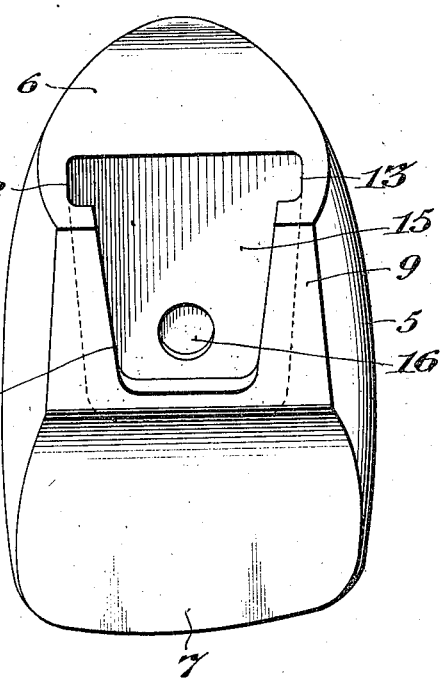
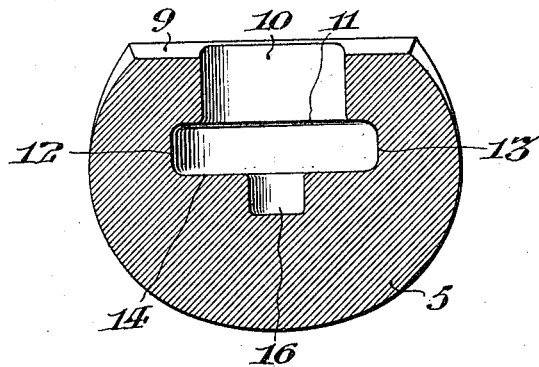
Inventor
Thomas F. Glenn,

UNITED STATES PATENT OFFICE.

THOMAS F. GLENN, OF ARDMORE, PENNSYLVANIA, ASSIGNOR TO THE S. S. WHITE DENTAL MANUFACTURING COMPANY, A CORPORATION OF PENNSYLVANIA.

ARTIFICIAL TOOTH.

1,209,142.

Specification of Letters Patent. Patented Dec. 19, 1916.

Application filed February 5, 1916. Serial No. 76,281.

*To all whom it may concern:*

Be it known that I, THOMAS F. GLENN, a citizen of the United States, and a resident of Ardmore, county of Montgomery, State of Pennsylvania, have invented certain new and useful Improvements in Artificial Teeth, of which the following is a specification, reference being had to the accompanying drawings.

My invention relates particularly to that class of artificial teeth commonly known as pinless or diatoric teeth, which are arranged to be attached to a plate or mounting, and is directed especially to the form of the retention.

The principal objects of my invention are, to provide an artificial tooth that is of simple construction; that is inexpensive to manufacture; that may be easily connected with its mounting; and that is so formed as to afford a highly tenacious attachment with said mounting without materially weakening the tooth structure.

Specifically stated, my invention comprehends an artificial tooth having a recess or depression extending into the body of the tooth from the back, and embraced by raised undercut walls which are preferably disposed in spaced relation thereto.

My invention also includes all of the various novel features of construction and arrangement hereinafter more definitely specified.

In the accompanying drawings, Figure 1 is a vertical longitudinal sectional view of a tooth conveniently embodying my improvements; Fig. 2 is a rear elevational view of the tooth shown in Fig. 1; and Fig. 3 is a transverse horizontal sectional view of said tooth taken on the line 3—3 in Fig. 1.

In said figures, the tooth body 5 is generally characteristic of the usual form of vulcanite teeth, having the "ridge-lap" 6, "bite" 7, and the intervening "shut" surface 9.

The tooth body 5 is provided with a recess 10, having the undercut shoulder 11 forming the lateral walls 12 and 13 and incisively disposed wall 14, and is preferably open at one end to facilitate the packing of the mounting material therein behind the shoulder 11. The labial wall 15 of said recess 10 is provided with a counter recess or depression 16 extending labially into the body of the tooth and arranged to receive the mounting material, which may be in plastic form, and thereby form, when hardened, a retaining lug on the mounting to prevent the accidental longitudinal displacement of the tooth body 5 from its mounting when engaged therewith.

Although I have shown the depression 16 as being cylindriform, it is obvious that it may be of any desired contour, but is preferably disposed in spaced relation to the undercut walls 12, 13 and 14.

It will be obvious that a tooth constructed in accordance with my invention not only affords ample retention in opposition to the natural strains tending to force it labially from its mounting, by the shoulder 11 of the undercut recess 10, but is also braced in opposition to strains tending to displace it longitudinally with respect to its mounting by reason of the counter recess or depression 16, which may be disposed in the central portion of the body of the tooth and of such size and contour as to afford any degree of strength desired to accomplish the rigidity of connection of the tooth structure with its mounting in such manner as to in effect form a composite unitary structure.

Although I have described the tooth as being adapted for vulcanite work, it is to be understood that it is not to be so limited, as it may be otherwise advantageously employed. Furthermore, I do not desire to limit my invention to the precise details of construction and arrangement herein set forth, as it is obvious that various modifications may be made therein without departing from the essential features of my invention as defined in the appended claims.

Having thus described my invention, I claim:

1. A tooth adapted for vulcanite work, having laterally disposed undercut shoulders, and a depression in its lingual face disposed between said shoulders and spaced therefrom.

2. A tooth adapted for vulcanite work, having a recess in its lingual wall formed by undercut shoulders, and a counter recess in the labial wall of said recess embraced upon three sides by said shoulders.

In witness whereof, I have hereunto set my hand this 4th day of February, A. D., 1916.

THOMAS F. GLENN.

Witnesses:
WILLIAM J. RUSSELL,
CLIFTON C. HALLOWELL.